US011060164B2

United States Patent
Filzwieser et al.

(10) Patent No.: US 11,060,164 B2
(45) Date of Patent: Jul. 13, 2021

(54) APPARATUS AND ARRANGEMENT FOR THE METALLURGICAL TREATMENT OF ELECTRICAL AND/OR ELECTRONIC SCRAP OR COMPONENTS AND USES THEREOF AND METHODS FOR THE METALLURGICAL TREATMENT OF ELECTRICAL AND/OR ELECTRONIC SCRAP OR COMPONENTS

(71) Applicant: URBANGOLD GMBH, Leoben (AT)

(72) Inventors: Andreas Filzwieser, Proleb (AT); Iris Filzwieser, Proleb (AT); Stefan Konetschnik, Leoben (AT); Robert Stibich, Brixlegg (AT)

(73) Assignee: URBANGOLD GMBH, Leoben (AT)

( * ) Notice: Subject to any disclaimer, the term of this patent is extended or adjusted under 35 U.S.C. 154(b) by 467 days.

(21) Appl. No.: 15/740,430

(22) PCT Filed: Jun. 27, 2016

(86) PCT No.: PCT/EP2016/064769
§ 371 (c)(1),
(2) Date: May 1, 2018

(87) PCT Pub. No.: WO2017/001306
PCT Pub. Date: Jan. 5, 2017

(65) Prior Publication Data
US 2018/0274058 A1    Sep. 27, 2018

(30) Foreign Application Priority Data

Jun. 29, 2015 (AT) .............................. A 50563/2015

(51) Int. Cl.
*C22B 15/00* (2006.01)
*C22B 7/00* (2006.01)
*C22B 1/00* (2006.01)

(52) U.S. Cl.
CPC .......... *C22B 15/0056* (2013.01); *C22B 1/005* (2013.01); *C22B 7/003* (2013.01); *Y02E 20/12* (2013.01); *Y02P 10/20* (2015.11)

(58) Field of Classification Search
CPC ..... C22B 15/0056; C22B 7/003; C22B 1/005; F27B 2014/0837; F27D 1/12; F27D 2009/002
See application file for complete search history.

(56) References Cited

U.S. PATENT DOCUMENTS 2,283,163 A * 5/1942 Brassert .................. F27B 1/025
75/576
3,078,529 A * 2/1963 Cooper .................. F27B 14/08
164/348
(Continued)

FOREIGN PATENT DOCUMENTS

AT    243 451        11/1965
CN    102978405      3/2013
(Continued)

OTHER PUBLICATIONS

JP Office Action (with English translation) issued in JP counterpart Application No. 2017-568417 dated Mar. 6, 2020.
(Continued)

*Primary Examiner* — Scott R Kastler
(74) *Attorney, Agent, or Firm* — Greenblum & Bernstein, P.L.C.

(57) ABSTRACT

An apparatus and an arrangement for the (pyro)metallurgical treatment of electrical and/or electronic scrap or components, which are in particular configured in such a way that substantially uncontaminated electrical and/or electronic scrap or components thereof can be processed without impurities. The apparatus or the arrangement includes a melting reactor, which has a cooler. The present invention also relates to the use of the apparatus or the arrangement for
(Continued)

the metallurgical treatment of electrical and/or electronic scrap or components and to the obtainment of raw copper or a precursor thereof, as well as to methods for the (pyro) metallurgical treatment of electrical and/or electronic scrap or components.

26 Claims, 1 Drawing Sheet

(56) References Cited

U.S. PATENT DOCUMENTS

| | | | |
|---|---|---|---|
| 3,266,789 A | | 8/1966 | Henry |
| 3,367,769 A | * | 2/1968 | Schott ..................... C22B 7/003 75/572 |
| 3,759,699 A | * | 9/1973 | Geiger, Jr. et al. ..... C21C 5/562 75/574 |
| 5,888,458 A | * | 3/1999 | Suwa ..................... C21C 5/565 266/44 |
| 2012/0138271 A1 | | 6/2012 | Filzwiezer et al. |
| 2014/0087321 A1 | | 3/2014 | Waniuk et al. |

FOREIGN PATENT DOCUMENTS

| | | |
|---|---|---|
| CN | 203602694 | 5/2014 |
| CN | 102 978 405 | 10/2014 |
| JP | 2001-208318 | 8/2001 |
| JP | 2002-221308 | 8/2002 |
| JP | 2009-035812 | 2/2009 |
| JP | 2009-222288 | 10/2009 |
| RU | 2 105 245 | 2/1998 |
| RU | 2 232 365 | 7/2004 |
| RU | 2 537 479 | 7/2013 |
| WO | 2010/136403 | 12/2010 |
| WO | WO 2012/146466 | 11/2012 |

OTHER PUBLICATIONS

CN Office Action (with English translation) issued in CN counterpart application No. 201680049775.5 dated Aug. 27, 2019.
Russian Office Action (with English translation) dated Mar. 25, 2020.
European Office Action dated Sep. 2, 2020 and issued in EP 16 731 933.4.

* cited by examiner

APPARATUS AND ARRANGEMENT FOR
THE METALLURGICAL TREATMENT OF
ELECTRICAL AND/OR ELECTRONIC
SCRAP OR COMPONENTS AND USES
THEREOF AND METHODS FOR THE
METALLURGICAL TREATMENT OF
ELECTRICAL AND/OR ELECTRONIC
SCRAP OR COMPONENTS

FIELD OF THE INVENTION

The present invention relates to an apparatus and an arrangement for the (pyro)metallurgical treatment of electrical and/or electronic scrap or components which are in particular configured in such a way that essentially pure electrical and/or electronic scrap or components thereof can be processed without impurities. The present invention also relates to the use of the apparatus or the arrangement for the metallurgical treatment of electrical and/or electronic scrap or components and for the obtainment of raw copper or a precursor thereof. Furthermore, the present invention relates to methods for the (pyro)metallurgical treatment of electrical and/or electronic scrap or components.

BACKGROUND

In light of the increasingly wide prevalence of electrical and electronic devices in everyday life, the waste from electrical and electronic devices is accordingly also increasing more and more. This presents society with the challenge that not only a significant amount of waste electrical and electronic devices must be disposed of properly, but also that valuable metals which are contained in waste of this type, and for which naturally existing resources are normally limited, should be recovered to the greatest possible extent. Electrical and electronic devices typically comprise a disproportionately high content of precious metals, and also of rare earth elements, indium, gallium and germanium, for which resources are particularly limited, or the availability of which is subject to geopolitical impediments, so that the recovery of precisely these types of strategically important elements is of great economic interest. For the purpose of preventing waste from electrical and electronic devices and also for the purpose of reuse, recycling and other forms of utilization of waste of this type in order to reduce the amount of waste that must be eliminated, EU Directive 2002/96/EC was adopted, for example, which is also referred to as the WEEE Directive (*Waste of Electrical and Electronic Equipment*) in common parlance.

Typically, waste electrical and electronic devices, hereinafter referred to as electrical and/or electronic scrap, are pretreated in shredder and/or sorting systems. The remaining electrical and/or electronic components—after removal of the magnetic portion, as well as the aluminum-rich portion and unmixed plastic portions—can undergo further metallurgical processing. However, especially in the metallurgical processing of the electrical and/or electronic scrap or components for the recovery or recycling of valuable metals, there exists the technical problem that the apparatuses previously used for this purpose can only process electrical and/or electronic scrap or components with a low content of organic constituents and/or in a mixture with impurities, that is, aggregates which are not electrical and/or electronic scrap or components. These impurities are typically copper scrap with a high copper content (usually greater than 85 wt %), which generally results in increased cost. The admixture of impurities can in particular be necessary because electrical and/or electronic scrap or components typically comprise a relatively high amount of plastics or other materials having a calorific value which combust during pyrometallurgical processing and can thereby release enough thermal energy that the risk of an overheat of the equipment can be present. These necessary impurities can therefore also be referred to as cooling scrap.

OBJECT OF THE INVENTION

One object of the present invention is therefore to provide an apparatus and methods for the metallurgical treatment of electrical and/or electronic scrap or components, which apparatus and methods are capable of essentially processing solely electrical and/or electronic scrap or components without impurities. It is also an object of the present invention to provide an apparatus and methods which allow a metallurgical treatment of electrical and/or electronic scrap or components in a most energy-efficient and environmentally friendly possible manner.

SUMMARY OF THE INVENTION

The inventors of the present invention have carried out extensive studies in order to attain these objects and, in particular, have discovered that, when essentially pure electrical and/or electronic scrap or components with correspondingly high contents of organic materials such as plastics, for example, are used as source materials, the thermal energy produced during the pyrometallurgical treatment can be dissipated through intensive cooling of the melting reactor and of the melting material contained therein, and that an input of essentially pure electrical and/or electronic scrap or components is thus possible without the need for impurities for cooling, such as cooling scrap. Accordingly, the apparatus according to the invention for the metallurgical treatment of electrical and/or electronic scrap or components envisages the use of an (actively) coolable melting reactor.

In particular, the present invention relates to an apparatus for the metallurgical (specifically pyrometallurgical) treatment of electrical and/or electronic scrap or components, wherein the apparatus comprises a melting reactor which comprises a cooling device, or cooler, and wherein the apparatus is configured for the metallurgical treatment of up to 100 wt % electrical and/or electronic scrap or components.

Furthermore, the present invention relates to an arrangement for the metallurgical treatment of electrical and/or electronic scrap or components, wherein the arrangement comprises an apparatus according to the invention and an exhaust gas cleaning device, or cleaner, which is in fluid communication with the apparatus.

The apparatus according to the invention and the arrangement according to the invention can be used in various applications, in particular for the metallurgical treatment of electrical and/or electronic scrap or components, or for the obtainment of raw copper or a precursor thereof.

Accordingly, the present invention also relates to the use of the apparatus according to the invention or the arrangement according to the invention for the metallurgical treatment of a material that is to be treated, wherein the material that is to be treated up to 100 wt % electrical and/or electronic scrap or components.

Furthermore, the present invention relates to the use of the apparatus according to the invention or the arrangement according to the invention for the obtainment (creation, production) of raw copper or a precursor thereof.

The present invention also relates to a method for the metallurgical (specifically pyrometallurgical) treatment of electrical and/or electronic scrap or components with a melting reactor, wherein the melting reactor is configured in such a way that up to 100 wt % electrical and/or electronic scrap or components can be used. The melting reactor can in particular be part of an apparatus according to the invention, and the method can in particular be carried out by means of an apparatus according to the invention.

Other objects and advantages of embodiments of the present invention will be evident from the detailed description below and the attached figures.

DETAILED DESCRIPTION OF THE INVENTION

More specific details of the present invention and additional embodiments thereof are described below. However, the present invention is not limited to the detailed description below, nor to the figures, but rather the description and figures merely serve to illustrate the teachings according to the invention.

It should be noted that features which are described in connection with an exemplary embodiment or exemplary subject matter can be combined with any other exemplary embodiment or with any other exemplary subject matter. In particular, features which are described in connection with an exemplary embodiment of the apparatus according to the invention can be combined with any other exemplary embodiment of the apparatus according to the invention and with any exemplary embodiment of the arrangement, of uses thereof, or any exemplary embodiment of the method according to the invention, and vice versa, unless expressly noted otherwise.

Where a term is referred to in the singular using an indefinite or definite article, such as "a", "an" or "the", for example, this also includes the plural term, and vice versa, unless clearly specified otherwise by the context. The expression "comprise", as used herein, includes not only the meaning of "to contain" or "to include", but rather can also mean "to be composed of" and "to be essentially composed of".

The apparatus for the metallurgical treatment of electrical and/or electronic scrap or components comprises a melting reactor which comprises a cooling device, or cooler, and is configured for the metallurgical treatment of up to 100 wt % electrical and/or electronic scrap or components.

The apparatus can in particular be suitable for the pyrometallurgical treatment or processing of electrical and/or electronic scrap or components. In particular, the electrical and/or electronic scrap or components can be processed thermally in or by means of the apparatus. This can in particular include a thermal decomposition or combustion of organic constituents of the electrical and/or electronic scrap or components, such as plastics for example, or other combustible components. This can also include in particular a partial or complete fusing of the metallic constituents of the electrical and/or electronic scrap or components. Furthermore, this can include an oxidative and/or a reductive treatment of the metallic constituents of the electrical and/or electronic scrap or components. This can also include a liquation (segregation of a molten material).

Within the meaning of the present application, "electrical and/or electronic scrap" is to be understood in particular as products, waste devices, and parts, as well as concentrates thereof, according to the WEEE Directive (EU Directive 2002/96/EC). This includes the following items in particular:

1. Large household appliances, in particular such as large cooling appliances; refrigerators; freezers; other large appliances used for refrigeration, conservation and storage of food; washing machines; clothes dryers; dish washing machines; cookers; electric stoves; electric hot plates; microwaves; other large appliances used for cooking and other processing of food; electric heating appliances; electric radiators; other large appliances for heating rooms, beds, seating furniture; electric fans; air conditioner appliances; other fanning, exhaust ventilation and conditioning equipment 2. Small household appliances, in particular such as vacuum cleaners; carpet sweepers; other appliances for cleaning; appliances used for sewing, knitting, weaving and other processing for textiles; irons and other appliances for ironing, mangling and other care of clothing; toasters; fryers; grinders, coffee machines and equipment for opening or sealing containers or packages; electric knives; appliances for hair cutting, hair drying, tooth brushing, shaving, massage and other body care appliances; clocks, watches and equipment for the purpose of measuring, indicating or registering time; scales 3. IT and telecommunications equipment and components thereof, in particular such as mainframes; minicomputers; printer units; personal computers (CPU, mouse, screen and keyboard included); laptops (CPU, mouse, screen and keyboard included); printed circuit boards; notebook computers; notepad computers; printers; copying equipment; electrical and electronic typewriters; pocket and desk calculators; other products and equipment for the collection, storage, processing, presentation or communication of information by electronic means; user terminals and systems; facsimile machines (fax); telex; telephones; pay telephones; cordless telephones; cellular telephones; answering systems; other products or equipment of transmitting sound, images or other information by telecommunications 4. Consumer equipment, in particular such as radio sets; television sets; video cameras; video recorders; hi-fi recorders; audio amplifiers; musical instruments; other products or equipment for the purpose of recording or reproducing sound or images, including signals, or other technologies for the distribution of sound and image than by telecommunications 5. Lighting equipment, in particular such as luminaires for fluorescent lamps with the exception of luminaires in households; straight fluorescent lamps; compact fluorescent lamps; high intensity discharge lamps, including pressure sodium lamps and metal halide lamps; low pressure sodium lamps; other lighting or equipment for the purpose of spreading or controlling light with the exception of filament bulbs 6. Electrical and electronic tools, in particular such as drills; saws; sewing machines; equipment for turning, milling, grinding, sawing, cutting, shearing, drilling, making holes, punching, folding, bending or similar processing of wood, metal and other materials; tools for riveting, nailing or screwing or removing rivets, nails, screws or similar uses; tools for welding and soldering or similar use; equipment for spraying, spreading, dispersing or other treatment of liquid or gaseous substances by other means; tools for mowing or other gardening activities 7. Toys, leisure and sports equipment, in particular such as electric trains or car racing sets; hand-held video game consoles; video games; computers for biking, diving, running, rowing, etc.; sports equipment with electric or electronic components; coin slot machines 8. Medical devices, in particular such as radiotherapy equipment; cardiology equipment; dialysis equipment; pulmonary equipment; nuclear medicine equipment; laboratory equipment for in vitro diagnosis; analyzers; freezers; fertilization tests; other appliances for detecting, preventing, monitoring, treating, alleviating illness, injury or disability 9. Monitoring and control instruments, in particular such as smoke detectors; heating regulators; thermostats; measuring, weighing or adjusting appliances for household or as laboratory equipment; other monitoring and control instruments used in industrial installations (e.g., in control panels)

10. Automatic dispensers, in particular such as automatic dispensers for hot drinks; automatic dispensers for hot or cold bottles or cans; automatic dispensers for solid products; automatic dispenser for money; other appliances which deliver automatically all kinds of products The electrical and/or electronic scrap or components can contain specifically, but not exclusively, one or more of the following metals: copper (Cu), nickel (Ni), tin (Sn), zinc (Zn), lead (Pb), antimony (Sb), gold (Au), silver (Ag), platinum (Pt), palladium (Pd), indium (In), gallium (Ga), rhenium (Re), and/or rare earth metals, including yttrium (Y).

In one embodiment, the material that is to be treated, such as the electrical and/or electronic scrap or components, can be reduced to small pieces or shredded before the metallurgical treatment, in particular the material that is to be treated, such as the electrical and/or electronic scrap or components, can be fed to the apparatus in such a form that it has been reduced to small pieces or shredded.

The apparatus for the metallurgical treatment of electrical and/or electronic scrap or components is configured for the metallurgical treatment of up to 100 wt % electrical and/or electronic scrap or components in the material that is to be treated. In other words, the apparatus for the metallurgical treatment of electrical and/or electronic scrap is configured in such a way that the proportion of electrical and/or electronic scrap in the material that is to be treated can be up to 100 wt %. In particular, the material that is to be treated in the apparatus can comprise at least 50 wt % electrical and/or electronic scrap or components, in particular at least 60 wt % electrical and/or electronic scrap or components, in particular at least 70 wt % electrical and/or electronic scrap or components, in particular at least 80 wt % electrical and/or electronic scrap or components, in particular at least 90 wt % electrical and/or electronic scrap or components, in particular at least 95 wt % electrical and/or electronic scrap or components, in particular at least 98 wt % electrical and/or electronic scrap or components.

In some embodiments, it can be advantageous to add, in addition to the electrical and/or electronic scrap or components, other aggregates such as for example an iron beam, copper, limestone and/or quartz to the material that is to be treated in the apparatus. This can result, for example, in the reduction of the melting point of the material that is to be treated, for example, with the formation of a eutectic system or a melt channel. Thus, in some embodiments, the material that is to be treated can also comprise less than 100 wt % electrical and/or electronic scrap or components, in particular less than 99 wt % electrical and/or electronic scrap or components, in particular less than 98 wt % electrical and/or electronic scrap or components, in particular less than 95 wt % electrical and/or electronic scrap or components, in particular less than 90 wt % electrical and/or electronic scrap or components, in particular less than 85 wt % electrical and/or electronic scrap or components, in particular less than 80 wt % electrical and/or electronic scrap or components.

All of the aforementioned lower limits and upper limits for the proportion of electrical and/or electronic scrap or components in the material that is to be treated can be combined with one another as desired, where logically possible.

The apparatus for the metallurgical treatment of electrical and/or electronic scrap or components comprises a melting reactor which comprises a cooling device.

The melting reactor can in particular be configured for the melting of the electrical and/or electronic scrap or components. Furthermore, the melting reactor can be configured for performing a (chemical) reaction for (on, with) the electrical and/or electronic scrap or components. In particular, the melting reactor can be configured in such a way that the material that is to be treated, such as the electrical and/or electronic scrap or components, is (at least partially) fused or converted into a molten material, and that a chemical reaction is performed on the fused material that is to be treated, such as the electrical and/or electronic scrap or components, for instance an oxidative reaction (combustion) on organic material such as plastics, for example, and/or a reductive reaction of possibly present metal oxides, for example.

In one embodiment, the melting reactor comprises a base and side walls, for example, four side walls. The melting reactor can, for example, be embodied to be approximately tub-shaped or trough-shaped.

The cooling device can in particular be configured for the (active) cooling of the melting reactor and/or of the material contained therein, such as the electrical and/or electronic scrap or components. Within the meaning of the present application, an "(active) cooling" can in particular be understood to mean that, without the presence of the cooling device, the temperature of the melting reactor and/or of the material contained therein would be higher than with the presence of the cooling device. An "(active) cooling" within the meaning of the present application is in particular distinguishable from a passive cooling or an allowing to cool (down). In particular, the cooling device can be configured in such a way that it can lower the temperature of the melting reactor and/or the material contained therein, such as the electrical and/or electronic scrap or components, and/or retard or reduce an increase in the temperature of the melting reactor and/or the material contained therein, such as the electrical and/or electronic scrap or components.

In one embodiment, the cooling device can be at least partially located in at least one of the side walls of the melting reactor, in particular in all side walls of the melting reactor. In particular, the melting reactor can essentially be completely embodied as a cooled design.

For example, the cooling device can comprise a system of pipes, lines or the like, through which a cooling medium can be conducted.

In particular, the cooling device can comprise a (free-flowing) cooling medium.

In one embodiment, the cooling device can be suitable or configured for cooling by means of an ionic liquid. In particular, the cooling device can contain a cooling medium such as an ionic liquid, for example. Other suitable cooling media include water, oils, molten salts, low-melting metals, low-melting alloys, and combinations thereof. Accordingly, in one embodiment the cooling device can also be suitable or configured for cooling by means of water, oils, molten salts, low-melting metals, low-melting alloys, and combinations thereof.

Within the meaning of the present application, an "ionic liquid" can contain only ions and can be in particular a salt or salt mixture which is present in a liquid state of aggregation at temperatures below 200° C., in particular below 100° C., without the salt or salt mixture thereby having been dissolved in a solvent such as water. An example of the cooling of a metallurgical furnace by means of an ionic liquid can be found in AT 508 292 A1, the disclosure of which is hereby incorporated in its entirety by way of reference.

In one embodiment, the apparatus also comprises an exhaust gas shaft which is arranged above the melting reactor. In particular, the exhaust gas shaft can be arranged above the melting reactor directly (without an element located therebetween). In particular, the exhaust gas shaft and the melting reactor can be adjacent to one another (on an imaginary line of intersection). In particular, the exhaust gas shaft and the melting reactor can be connected to one another or attached to one another. The (lower) cross-section of the exhaust gas shaft adjacent to the melting reactor can essentially correspond to the (upper) cross-section of the melting reactor adjacent to the exhaust gas shaft. The exhaust gas shaft can in particular have an essentially rectangular cross-section.

In one embodiment, the exhaust gas shaft can be designed as a waste heat boiler (or as a waste heat steam generator). In particular, the exhaust gas shaft can essentially be designed completely as a waste heat boiler. In particular, the exhaust gas shaft can be part of a waste heat boiler. In particular, the cooling elicited by the cooling device of the melting reactor can allow or facilitate a direct arrangement of the waste heat boiler on the melting reactor. The waste heat boiler can be configured in particular for the recovery of waste heat, in particular for the conversion of waste heat into electricity. It can thus be possible to further dissipate the thermal energy present or released during the metallurgical treatment of electrical and/or electronic scrap or components, for example, in order to prevent an overheat of the apparatus. In addition, it can thus also be possible to further utilize in a useful manner the thermal energy present or released during the metallurgical treatment of electrical and/or electronic scrap or components, for example, to convert the waste heat into electricity. As a result, it can thus be possible to increase the energy efficiency of the apparatus for the metallurgical treatment of electrical and/or electronic scrap or components, which can provide advantages both in regard to the efficiency of the apparatus and also for environmental protection reasons.

The hollow space volume of the exhaust gas shaft or the waste heat boiler can be considerably larger than the hollow space volume of the melting reactor. Within the meaning of the present application, "hollow space volume" is in particular to be understood as the volume of the interior space of, for example, the exhaust gas shaft or the melting reactor, in particular, the ratio of the hollow space volume of the exhaust gas shaft or the waste heat boiler to the hollow space volume of the melting reactor can be greater than 2, in particular greater than 3, in particular greater than 4, in particular greater than 5, in particular greater than 6, in particular greater than 8, in particular greater than 10, and in particular less than 100, in particular less than 50. An exhaust gas shaft that is large in comparison with conventional apparatuses can in particular be capable of removing a large amount of gas that is produced in the combustion of organic material, such as during the metallurgical treatment of up to 100 wt % electrical and/or electronic scrap or components, for example.

In one embodiment, the apparatus can also comprise a feed device, or feeder, for gases and fine-grained solids, in particular for air and/or a fuel. In some embodiments, the feed of air or another oxygen-containing gas can promote the combustion of organic material, such as plastic for example, of the electrical and/or electronic scrap or components. In some embodiments, it can be useful to also add a (fine-grained) fuel or a combustible gas, such as for instance natural gas or coal dust, for example to regulate or control the temperature in the apparatus. In some embodiments, it can also be possible to introduce a portion of the electrical and/or electronic scrap or components that is/are to be treated, for example up to 15%, in particular 1% to 10%, of the total amount, via the feed device for gases and fine-grained solids.

The feed device for gases and fine-grained solids can in particular be embodied as a lance or as a tube, which lance or tube can project into the melting reactor. Alternatively, the feed device for gases and fine-grained solids can, for example, also be embodied as one or more nozzles, as impulse burners or as plasma burners.

In one embodiment, the melting reactor can comprise a base-end gas feed device, in particular for a reducing gas such as hydrogen. In some embodiments the feed of a reducing gas, such as for example hydrogen, natural gas or cracked gas, wherein in each case an admixture of nitrogen, argon and/or air is also possible, into the melting reactor or into the material (e.g., the melting material) located therein can be useful, for example, for the reduction of possibly present metal oxides in the molten material, which can lead to an increase in the yield of metals recovered from the electrical and/or electronic scrap or components.

The base-end gas feed device can in particular comprise purging plugs. The purging plugs can in particular be porous purging plugs. However, they can also be directional purging plugs (e.g., in the form of small tubes).

In one embodiment, the melting reactor can be attached such that it is removable from the apparatus, in particular is replaceable. As described above, the melting reactor can be attached to an exhaust gas shaft. The attachment can in particular be releasable. An imaginary line of intersection between the exhaust gas shaft and the melting reactor can in particular run obliquely (at an incline) in order to facilitate a replacement of the melting reactor. A replaceability of the melting reactor can in particular lead to a reduction in downtime during maintenance and/or repair of the melting reactor, since a melting reactor that is to be serviced or repaired can be easily replaced by another (functional) melting reactor. A lengthy downtime of the apparatus and the accompanying production losses can thus be avoided to a great extent. A simple replaceability can in particular be enabled in that the exhaust gas shaft or the waste heat boiler can be provided directly adjacent to the melting reactor.

In one embodiment, the melting reactor can be equipped with an exchange system. An exchange system of this type can in particular enable a replacement of the melting reactor from the apparatus. In particular, the exchange system can include rollers or wheels.

Furthermore, the apparatus can comprise a feed device for the material that is to be treated, such as the electrical and/or electronic scrap or components. The feed device for the material that is to be treated can, for example, be provided in an exhaust gas shaft or waste heat boiler, in particular on an upper section thereof.

Furthermore, the apparatus can comprise a removal device for the metals recovered from the electrical and/or electronic scrap or components. The removal device can be designed as a discharge by means of tapping. The removal device can for example be provided in the melting reactor, in particular in a base of the melting reactor or another bottom section of the melting reactor.

Furthermore, the apparatus can comprise an exhaust gas exit opening. The exhaust gas exit opening can be configured for the exit or the escape of exhaust gas from the apparatus. The exhaust gas exit opening can for example be provided in an exhaust gas shaft or waste heat boiler, in particular on a top section or an upper end thereof. In one embodiment, the exhaust gas exit opening can be offset laterally from the exhaust gas shaft.

The arrangement for the metallurgical treatment of electrical and/or electronic scrap or components comprises an apparatus according to the invention and an exhaust gas cleaning device, or cleaner, which is in fluid communication with the apparatus.

The exhaust gas cleaning device can in particular be in fluid communication with an exhaust gas shaft, in particular an exhaust gas exit opening, of the apparatus. Within the meaning of the present application, "in fluid communication" can in particular mean that exhaust gas from the apparatus can reach the exhaust gas cleaning device in an essentially lossless manner.

The exhaust gas cleaning device can in particular contain at least one filter element. The exhaust gas cleaning device can also comprise multiple filter elements with possibly different filter properties.

The at least one filter element can in particular be suitable for the removal of solid particles, in particular of metal-containing dust. In this manner it can in particular be possible to collect and—possibly after further processing—continue to use valuable metals in the exhaust gas, such as for example zinc and also lead and tin. Thus, on the one hand, the yield of valuable metals in the metallurgical treatment of electrical and/or electronic scrap or components can be further increased, which can be beneficial to the efficiency of the arrangement. On the other hand, a removal of solid particles, in particular of metal-containing dust, can also be necessary for environmental protection reasons.

The at least one filter element can in particular also be suitable for the removal of harmful gases, such as halogens, dioxins or furans, which can in particular also be necessary for environmental protection reasons.

The apparatus according to the invention or the arrangement according to the invention can in particular be used for the (pyro)metallurgical treatment of a material that is to be treated, wherein the material that is to be treated contains up to 100 wt % electrical and/or electronic scrap or components.

The apparatus according to the invention or the arrangement according to the invention can in particular be used for the obtainment of raw copper or a precursor thereof.

Valuable metals in the raw copper can in particular be copper (e.g., 80-90 wt %), nickel (e.g., up to 5 wt %), tin (e.g., approximately 0.5 wt %), lead (e.g., approximately 0.5 wt %), antimony (e.g., up to 3 wt %), precious metals such as gold; silver; platinum; palladium (e.g., up to 0.5 wt % in total), rare earth elements, indium, gallium, germanium (e.g., up to 1 wt % in total).

In the method for the metallurgical (specifically pyrometallurgical) treatment of electrical and/or electronic scrap or components with a melting reactor, the melting reactor is configured in such a way that up to 100 wt % electrical and/or electronic scrap or components can be used. The melting reactor can in particular be part of an apparatus according to the invention, and the method can be carried out by means of an apparatus according to the invention. In particular, the melting reactor can be (actively) coolable, and the method can comprise an (active) cooling of the melting reactor and/or the contents thereof. The method can in particular be suitable for the obtainment of raw copper or a precursor thereof.

In the method for the metallurgical treatment of electrical and/or electronic scrap or components up to 100 wt % electrical and/or electronic scrap or components can be used as material that is to be treated. In other words, the melting reactor used in the method is configured in such a way that the proportion of electrical and/or electronic scrap or components in the material that is to be treated can be up to 100 wt %. In particular, the material that is to be treated in the method can comprise at least 50 wt % electrical and/or electronic scrap or components, in particular at least 60 wt % electrical and/or electronic scrap or components, in particular at least 70 wt % electrical and/or electronic scrap or components, in particular at least 80 wt % electrical and/or electronic scrap or components, in particular at least 90 wt % electrical and/or electronic scrap or components, in particular at least 95 wt % electrical and/or electronic scrap or components, in particular at least 98 wt % electrical and/or electronic scrap or components.

Furthermore, in some embodiments, the material that is to be treated can also comprise less than 100 wt % electrical and/or electronic scrap or components, in particular less than 99 wt % electrical and/or electronic scrap or components, in particular less than 98 wt % electrical and/or electronic scrap or components, in particular less than 95 wt % electrical and/or electronic scrap or components, in particular less than 90 wt % electrical and/or electronic scrap or components, in particular less than 85 wt % electrical and/or electronic scrap or components, in particular less than 80 wt % electrical and/or electronic scrap or components.

All of the aforementioned lower limits and upper limits for the proportion of electrical and/or electronic scrap or components in the material that is to be treated can be combined with one another as desired, where logically possible.

In one embodiment, the electrical and/or electronic scrap or components can contain up to 60 wt % organic constituents, such as for example plastics or other combustible components, in particular up to 55 wt % organic constituents, in particular up to 50 wt % organic constituents, in particular up to 45 wt % organic constituents, in particular up to 40 wt % organic constituents, in particular up to 35 wt % organic constituents, in particular up to 30 wt % organic constituents, in particular up to 25 wt % organic constituents. Furthermore, in some embodiments, the electrical and/or electronic scrap or components can contain at least 5 wt % organic constituents, such as for example plastics or other combustible components, in particular at least 10 wt % organic constituents, in particular at least 15 wt % organic constituents, in particular at least 20 wt % organic constituents, in particular at least 25 wt % organic constituents, in particular at least 30 wt % organic constituents. All of the aforementioned lower limits and upper limits for the proportion of organic constituents in the electrical and/or electronic scrap or components can be combined with one another as desired, where logically possible.

In the method for the metallurgical treatment of electrical and/or electronic scrap or components, organic constituents that are present in the electrical and/or electronic scrap or components can be burned. The (thermal) energy produced thereby can in particular be used for the fusing of the metallic and/or oxidic constituents in the electrical and/or electronic scrap or components. Additionally or alternatively thereto, the (thermal) energy produced thereby can in particular be used to generate electrical current, process heat, and/or district heat, for example, by means of a waste heat boiler.

In one embodiment, (active) cooling takes place in the method, for example to remove energy from the melting reactor; in particular the melting reactor can be (actively) cooled. This can in particular occur by means of ionic liquids, oils, molten salts, low-melting alloys, low-melting metals, water and/or steam, and combinations thereof.

The method for the metallurgical treatment of electrical and/or electronic scrap or components can, for example, comprise the following steps:

Loading of an apparatus, in particular an apparatus according to the invention, with up to 100 wt % electrical and/or electronic scrap or components, which optionally has/have beforehand been reduced to small pieces and/or mechanically processed; and Fusing of the electrical and/or electronic scrap or components (e.g., in a melting reactor of the apparatus) with combustion of organic contents thereof.

Furthermore, the method can comprise an (active) cooling of the melting reactor, for example, by means of ionic liquids, oils, molten salts, low-melting alloys, low-melting metals, water and/or steam, and combinations thereof.

In one embodiment, the method can also comprise an at least partial reduction of oxidized constituents in the molten material or a feed of a reducing gas or gas mixture into the molten material via a base-end gas feed. In this manner, it can be possible to increase the yield of metal.

In one embodiment, additional energy can be introduced, in particular by means of natural gas and/or plasma. It can thus be possible to maintain the necessary process temperature.

In one embodiment, the process gas can be cleaned with at least one filter element and/or scrubber.

The present invention is further described by way of reference to the figures, which however are merely intended to help illustrate the teachings according to the invention, and are in no way intended to limit the scope of the present invention. The individual figures should only be considered to be schematic in nature, and are not necessarily true to scale. Identical or similar elements in different figures are designated by the same reference characters.

Figure 1:
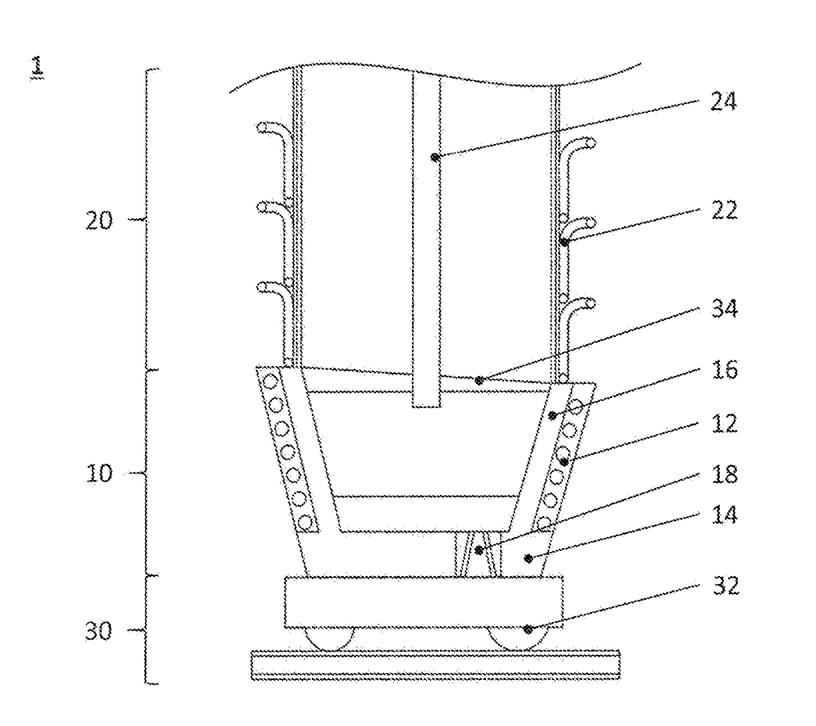
FIG. 1 shows a side view of a section of an apparatus for the metallurgical treatment of electrical and/or electronic scrap or components according to an exemplary embodiment.

FIG. 1 shows a side view of a section of the apparatus for the metallurgical treatment of electrical and/or electronic scrap or components 1 according to an exemplary embodiment.

The apparatus shown in FIG. 1 for the metallurgical treatment of electrical and/or electronic scrap or components 1 comprises three regions: an exhaust gas shaft 20, a melting reactor 10, and an exchange system 30.

The melting reactor 10 is embodied to be tub-shaped, having side walls 16 and a base 14. In the side walls 16 of the melting reactor 10, a cooling device, or cooler 12 is provided which is configured for cooling the melting reactor 10 and/or the material contained therein, such as the electrical and/or electronic scrap or components. In the base 14 of the melting reactor 10, a base-end gas feed device 18 is provided which is configured for feeding a reducing gas.

The exhaust gas shaft 20 is arranged directly adjacent to the melting reactor 10. Between the exhaust gas shaft 20 and the melting reactor 10, an imaginary line of intersection 34 that runs obliquely or at an incline is drawn. The exhaust gas shaft 20 is essentially embodied completely as a waste heat boiler 22 that is configured for the recovery of waste heat. In the exhaust gas shaft 20, a feed device for gases and fine-grained solids 24 projects down into the melting reactor 10, which device is embodied as a lance or as a tube.

The exchange system 30 is located below the melting reactor 10 at the base 18 thereof. The exchange system 30 comprises rollers or wheels 32 which allow a pushing-out or moving-out of the melting reactor 10 away from the apparatus 10 or the exhaust gas shaft 20 thereof. Due to the sloped arrangement of the line of intersection 34, the melting reactor 10 can be easily pushed-out or moved-out to the left in the configuration shown in FIG. 1.

The present invention has been described based on specific embodiments and figures. However, the invention is not limited thereto, and various modifications thereof are possible without exceeding the scope of the present invention. Reference characters in the claims are not to be considered a limitation.

LIST OF REFERENCE NUMERALS

1 Apparatus for the metallurgical treatment of electrical and/or electronic scrap or components
2 Arrangement for the metallurgical treatment of electrical and/or electronic scrap or components
10 Melting reactor
12 Cooling device
14 Base
16 Side wall
18 Base-end gas feed device
20 Exhaust gas shaft
22 Waste heat boiler
24 Feed device for gases and fine-grained solids
30 Exchange system
32 Rollers or wheels
34 Line of intersection

The invention claimed is:

1. An apparatus configured for metallurgical treatment of electrical and/or electronic scrap or components, comprising:
a melting reactor structured and arranged to receive therein electrical and/or electronic scrap or components;
said melting reactor comprising:
a base;
sidewalls; and
a cooler arranged inside the sidewalls of the melting reactor;
said cooler being sized and configured to remove energy from the melting reactor during the metallurgical treatment of the electrical and/or electronic scrap or components in the melting reactor,
wherein the apparatus is configured for the metallurgical treatment of electrical and/or electronic scrap or components containing between at least 5 wt % and up to 60 wt % organic constituents; and
wherein the cooler contains an ionic liquid cooling medium.

2. An apparatus configured for metallurgical treatment of electrical and/or electronic scrap or components, comprising:
a melting reactor structured and arranged to receive therein electrical and/or electronic scrap or components;
said melting reactor comprising a cooler structured and configured to remove energy from the melting reactor during the metallurgical treatment of the electrical and/or electronic scrap or components in the melting reactor,
wherein the apparatus is configured for the metallurgical treatment of electrical and/or electronic scrap or components containing between at least 5 wt % and up to 60 wt % organic constituents, and
wherein the cooler contains an ionic liquid cooling medium.

3. The apparatus according to claim 1, wherein the apparatus further comprises an exhaust gas shaft arranged above the melting reactor.

4. The apparatus according to claim 3, wherein the exhaust gas shaft is essentially arranged directly above the melting reactor.

5. The apparatus according to claim 3, wherein the exhaust gas shaft is a waste heat boiler for one of:
recovery of waste heat; and
conversion of waste heat into electricity.

6. The apparatus according to claim 3, wherein the exhaust gas shaft has an essentially rectangular cross-section.

7. The apparatus according to claim 1, wherein the apparatus further comprises a feeder for one of:
gases and fine-grained solids; and
air and/or a fuel.

8. The apparatus according to claim 7, wherein the feeder is one of:
a lance or a tube; and
a lance or tube that projects into the melting reactor.

9. The apparatus according to claim 1, wherein the melting reactor comprises one of:
a base-end gas feeder;
a base-end gas feeder for a reducing gas; and
a base-end gas feeder for a hydrogen reducing gas.

10. The apparatus according to claim 9, wherein the base-end gas feeder comprises one of:
purging plugs; and
porous purging plugs.

11. The apparatus according to claim 1, wherein the melting reactor is one of:
configured to be removable from the apparatus; and
configured to be replaceable.

12. The apparatus according to claim 11, wherein the melting reactor is equipped with an exchange system configured to allow for movement of the melting reactor.

13. The apparatus according to claim 12, wherein the exchange system includes rollers or wheels.

14. An arrangement for metallurgical treatment of electrical and/or electronic scrap or components, wherein the arrangement comprises:
an apparatus according to claim 1, and
an exhaust gas cleaner which is in fluid communication with the apparatus.

15. The arrangement according to claim 14, wherein the exhaust gas cleaner contains at least one filter element for removal of one of:
solid particles; and
metal-containing dust.

16. A method of using the apparatus of claim 1, comprising:
placing into the melting reactor material containing the electrical and/or electronic scrap or components which include copper; and
utilizing the cooler to remove energy from the melting reactor.

17. The method of claim 16 further comprising:
obtaining raw copper or a precursor thereof.

18. A method for metallurgical treatment of electrical and/or electronic scrap or components utilizing a melting reactor, the method comprising:
placing into the melting reactor electrical and/or electronic scrap or components;
melting, with the melting reactor, the electrical and/or electronic scrap or components containing between at least 5 wt % and up to 60 wt % organic constituents; and
utilizing a cooler to remove energy from the melting reactor during the metallurgical treatment of electrical and/or electronic scrap or components.

19. The method according to claim 18, further comprising obtaining raw copper or a precursor thereof when the electrical and/or electronic scrap or components contain copper.

20. The method according to claim 18, wherein the cooler provides cooling by way of at least one of ionic liquids, oils, molten salts, low-melting alloys, low-melting metals, water and/or steam.

21. The method according to claim 18, further comprising utilizing energy from combustion of the organic constituents to fuse metallic and/or oxidic constituents.

22. The method according to claim 18, further comprising utilizing energy from combustion of the organic constituents to generate at least one of; electrical current, process heat, and/or district heat.

23. The method according to claim 18, further comprising feeding one of; hydrogen, cracked gas and/or natural gas, with or without admixture of argon, nitrogen and/or air, through a base-end gas feed.

24. The method according to claim 18, further comprising introducing additional energy using natural gas and/or plasma.

25. The method according to claim 18, further comprising cleaning a process gas with at least one filter element and/or scrubber.

26. An apparatus configured for metallurgical treatment of electrical and/or electronic scrap or components, comprising:
a melting reactor structured and arranged to receive therein the electrical and/or electronic scrap or components;
said melting reactor comprising a base, sidewalls and a cooler arranged on the sidewalls of the melting reactor;
said cooler being structured and configured to actively cool the melting reactor with an ionic liquid cooling medium during metallurgical treatment of the electrical and/or electronic scrap or components in the melting reactor;
said cooling medium being structured and configured to remove energy from the melting reactor during the metallurgical treatment of electrical and/or electronic scrap or components and being configured to provide cooling without need of cooling impurities,
wherein the apparatus is configured for the metallurgical treatment of electrical and/or electronic scrap or components containing between at least 5 wt % and up to 60 wt % organic constituents.

\* \* \* \* \*